Patented Sept. 2, 1941

2,254,788

UNITED STATES PATENT OFFICE 2,254,788

ACID RECOVERY PROCESS

Seaver A. Ballard, Berkeley, Calif., assignor to Shell Development Company, San Francisco, Calif., a corporation of Delaware No Drawing. Application January 8, 1940,
Serial No. 312,944

6 Claims. (Cl. 23—172)

This invention relates to the recovery of inorganic oxy acids which have become contaminated with organic impurities and deals with an improved method for reclaiming waste or spent acid such as is obtained in a wide variety of chemical processes. The invention provides a new method of treating contaminated acid whereby not only may purified acid be more efficiently and cheaply obtained but also the organic impurities may be recovered in a more valuable form than has hitherto been feasible. Still other objects and advantages of the invention will be apparent to those skilled in the art from the following description.

Large amounts of waste sulphuric acid, in the form of acid sludges and the like, are obtained in the treatment of petroleum products. Much work has been done on the recovery of such acid but the results have not been entirely satisfactory because the best methods which have been evolved are subject to material losses of acid and other valuable components as well as to considerable operating difficulties. For the purpose of making the invention more clear it will be described with particular reference to its application to the solution of the problems presented by such acid and in the interest of conciseness, with especial emphasis on the recovery of sulphuric acid which has been used as a catalyst for the alkylation of isoparaffins by means of olefines as described, for example, in copending applications Serial No. 150,544, filed June 26, 1937, and Serial No. 276,062, filed May 27, 1939. Such acid is particularly difficult to recover in a form suitable for reuse in the process because small amounts of impurities in the acid seriously interfere with the alkylation reaction but the present invention is especially advantageous therewith as by its use effective alkylation catalysis acid may be readily regenerated. It is to be understood, however, that the invention is not limited to the treatment of such acid as it not only may be used for the recovery of other alkylation acids such as those which have been used for the alkylation of aromatic hydrocarbons or of phenols or the like as described in United States Patent 2,051,473 for example, but also may be used for the regeneration of acids which have been employed in other reactions. Illustrative of other types of contaminated acid which may be treated advantageously by the process are, for example, acid which has been used for polymerization of olefines as described in United States Patents 2,007,159, 2,007,160, 2,055,415, 2,142,937 and 2,174,247; acid recovered in the manufacture of alkyl sulfates or the like as disclosed in United States Patents 2,078,516 and 2,139,393 or from the production of sulphonic acids as shown in United States Patent 1,947,652; acid which has been used for the direct hydration of olefines; acid derived from the manufacture of ethers as disclosed in U. S. Patent 1,819,348 or other suitable methods or from other sources. In fact the process of the invention may be used with advantage wherever inorganic oxy acids such as sulphuric, phosphoric, benzene sulphonic, sulphonic and like acids which have become contaminated through contact with olefinic compounds are to be purified.

The exact nature of the organic impurities which are present in sulphuric acid which has been used as a catalyst for the alkylation of isoparaffins with olefines is not fully known and probably comprises different types of compounds which vary with the nature of the materials present in the alkylation mixture and the alkylation conditions used. Whatever the mechanism of the reaction involved, it has been found that by treatment with hydrochloric, or other analogous halogen acid the organic impurity content of alkylation acid may be substantially reduced and purification of the acid may be greatly facilitated and improved.

Any suitable method of contacting the waste acid with the chosen hydrogen halide may be used. The treatment is preferably carried out at temperatures below about 50° C. as high temperatures lead to undesirable reactions such as sulphonation of organic compounds present and the like. More preferably temperatures below 30° C., most preferably temperatures between the freezing point of the acid and about 20° C., are employed. The reaction appears to be an equilibrium one and it is advantageous to maintain an excess of the hydrogen halide, for example by keeping the mixture under a hydrogen chloride pressure, in order to prevent undesirable reversal of the reaction prior to separation of the reaction products. The waste acid being treated may, for example, be saturated with hydrogen chloride in a closed reactor until the pressure builds up sufficiently to insure the desired excess. Satisfactory results have been obtained by carrying out the process under a pressure of about 60 pounds per square inch but higher or lower pressures may be used.

The treatment may be carried out in a mixer provided with suitable stirring means or the like for promoting intimate contact of hydrogen halide and waste acid or gaseous hydrogen halide may be bubbled through the acid or the two may be contacted by countercurrent flow through a suitable packed tower or the like or a tubular reactor may be used. The treatment may be carried out batchwise intermittently or continuously. Relatively short treatment times are usually sufficient. In batch operation with gaseous hydrogen chloride, for example, only the time required to bring the hydrogen chloride pressure to a substantially constant pressure in the reactor is necessary although to insure thorough contact it may be desirable to continue the treatment for 5 to 20 minutes after constant pressure conditions are reached.

The treatment with halogen acid causes separation of organic material present therein either as an immiscible liquid phase or as vapor depending upon the temperature and pressure conditions used. It is an important advantage of the invention that the impurities thus eliminated are largely in the form of halogen derivatives which may be recovered and used for many purposes. These valuable products may be separated by fractional distillation or other suitable treatment from other organic material simultaneously removed from the acid. In this way halides corresponding to the unsaturated compounds with which the acid has been in contact have been economically recovered.

In order to promote rapid reaction it is desirable that the free acid concentration of the inorganic oxy acid be at least 10% and more preferably above 35% during the treatment with the hydrogen halide. To this end it may be advantageous when treating very badly contaminated acid to add an amount of pure or less contaminated acid sufficient to bring the free acid concentration up to the desired strength. It is also preferred that the proportion of acid to water be maintained relatively high during the hydrogen halide treatment and preferably that acid of at least 90% or more preferably at least 95% concentration on a hydrocarbon free basis be used although lower concentrations such, for example, as 80% have been found to be suitable and even lower concentrations, may be employed by making compensating increases in the temperature of operation. Suitable organic solvents may be used either for extraction after the hydrogen halide treatment or to extract the reaction products as fast as formed during the treatment. Preferred solvents are those which are easily separated from the valuable products by distillation and which undergo under the operating conditions no reactions which interfere with the desired removal of reaction products. Liquid propane, normal and isobutanes, pentane, benzene, cyclohexane, suitable gasoline fractions and the like may be used. One advantage of liquid phase operation whether with added solvent or not is that certain types of impurities present in the acid such for example, as neutral alkyl esters of the acid and the like may be extracted into the halide reaction product layer and conveniently removed therewith. Even when operating under conditions at which the reaction products are removed in the vapor phase which, most preferably, is effected under reduced pressure in order that the temperature may be maintained relatively low, it may be advantageous to add suitable agents for promoting the desired separation. Thus inert gases or vapors which form azeotropes with, or increase with effective vapor pressure of, the materials to be separated or otherwise facilitate such separation may be used. Suitable means for recovering unreacted halogen acid for recycling to the process should preferably be provided.

It is a feature of the invention that those organic impurities which cause the greatest difficulty in the treatment of waste acids are removed by halogen acid treatment according to the invention. Thus it appears that organic esters of inorganic acids which are responsible for foaming and emulsification difficulties when the usual acid recovery methods are used are eliminated or converted so that the acid may be treated in any desired manner for the removal of any remaining undesired components or for any other purpose without encountering such difficulties.

Although the hydrogen halide treatment may be sufficient by itself to effect the required purification or regeneration of the acid so that it may be successfully applied in the reaction in which it was previously used and/or for other purposes, in some cases it may be desirable to subject the acid to further purification treatment. Thus, for example, sulphuric acid which has been employed for the alkylation of isoparaffins or the like with higher olefines such as cracked gasoline olefines, etc., has been found to still contain a certain amount of hydrocarbon impurities after treatment with hydrogen chloride according to the present invention. Such hydrocarbon may be readily removed however by diluting the treated acid with water and separating the resulting hydrocarbon phase by stratification and decantation or centrifugation or the like. Solvent extraction may be used to promote separation of hydrocarbon after dilution, pentane, isopentane, benzene, phenols, particularly alkyl phenols, higher alcohols and ketones, and the like, being suitable solvents. The separation of hydrocarbon may be effected at ordinary temperature although, particularly where dilution to an acid concentration above 55% on a hydrocarbon free basis is used, higher temperatures of the order of about 40° to 70° C. are of advantage in promoting more rapid and complete hydrocarbon separation. The separation in any case is much better than that obtained without prior hydrogen halide treatment since there is much less tendency for hydrocarbon to be retained in the acid phase as a result of emulsification or the like. Dilution to about 45 to 60% acid concentration on an inorganic free basis is usually satisfactory although where solvents and/or elevated temperatures are used diluting to 65 to 75% may be employed. After separation of the liberated hydrocarbon the dilute acid may be readily reconcentrated for reuse in the process. In reconcentration foaming difficulties are greatly reduced as a result of the absence of esters and heat transfer problems resulting from the deposition of carbon on the heating elements are minimized due to the more complete removal of carbonaceous impurities.

Depending upon the nature of the acid being treated it may be advantageous to subject the hydrogen halide treated acid, preferably after separation of any impurities which may be liberated by dilution, to further processing for decomposition of any remaining small amounts of organic materials. Thus, oxidation by air blowing and/or carbonization by heat treatment or the like may be used. In any such case acid which has been previously treated with hydrogen halide is more advantageous since it eliminates the usual foaming difficulties of air blowing and gives carbonization products which are more easily separated by filtration or settling because of the larger size of carbon particles obtained in the absence of esters having dispersing properties.

The following example illustrates one suitable method of carrying out the invention:

Sulphuric acid which had been used in 98% concentration to treat a propane-propylene fraction in the liquid phase until the free acid concentration had fallen to 38.70% and which contained 18.87% of carbon was treated in a bronze reactor provided with a motor driven impeller to provide intimate mixing. Anhydrous hydrochloric acid gas was forced in until the pressure remained constant at 60 pounds per square inch, the rate of addition be such that no rise in temperature took place. Stirring was continued at 10 to 12° C. for 15 minutes under 60 pounds pressure after addition of hydrogen chloride was stopped. The reaction mixture was then drained into a distillation kettle which was connected through a second distillation kettle and carbon dioxide cooled liquid separators to a scrubbing tower for recovery of hydrochloric acid. After complete removal and absorption of all excess hydrogen chloride a vacuum (about 100 mm. Hg pressure) was applied to the kettle (through the carbon dioxide cooled cold traps) and the upper layer present therein was flash distilled into the second distilling kettle at a temperature of 10 to 15° C. The valve to the reactor was allowed to remain open during the flash distillation in order to remove the last drainings. When the upper layer had been completely distilled into the second kettle which was provided with a distilling column, the liquid from the cold traps was added and the chlorine containing products, found to be substantially 2-chloropropane, were fractionated off. As bottom product from the flash distillation the sulphuric acid content of the original charge was substantially quantitatively recovered as an acid of 93.50% total acidity containing organic impurities corresponding to only 1.43% carbon. The 2-chloro-propane recovered was calculated to be equivalent to 89.5% of the organic material removed from the acid. The acid recovered was suitable for use as catalyst for the alkylation of isoparaffins with propylene or other olefines.

It will be apparent that the invention offers many advantages particularly in the efficiency and economy with which organic impurities may be separated from inorganic oxy acids without loss of acid or destruction of components which may be recovered in a valuable form. The invention is not only capable of wide variation with respect to the inorganic acids which may be successfully purified thereby but also in regard to the method and conditions of treatment. For example instead of treating with hydrogen chloride alone mixtures of hydrogen chloride and free chlorine may be used and also in place of hydrogen halide it is feasible to use compounds which liberate hydrogen halide under the treatment conditions. Thus where some loss of acid is economically justifiable sodium chloride, for example, may be added to sulphuric acid containing organic impurities and the mixture warmed to liberate sufficient hydrogen chloride to effect removal of impurities in accordance with the invention. Still other changes and variations in the process may be made and it will therefore be clear that the invention is not limited to the details of operation described by way of illustration nor by any theory proposed in explanation of the markedly improved results obtained but only by the terms of the accompanying claims.

I claim as my invention:

1. In a process for removing organic impurities from sulfuric acid which has been contacted with olefinic hydrocarbon, the step comprising intimately contacting an excess of hydrogen chloride with said acid at a temperature between the freezing point of said acid and about 50° C. for a period of time not exceeding about 20 minutes, under which conditions at least a part of said impurities is rendered insoluble in said acid, said insoluble impurities consisting of a fluid phase comprising essentially organic halides.

2. The process according to claim 1 including flash distilling the insoluble fluid organic phase.

3. In a process for removing organic impurities from sulfuric acid which has been contacted with olefinic hydrocarbon, the steps comprising intimately contacting said acid at a concentration of at least 80% on a hydrocarbon free basis and at a temperature between the freezing point of said acid and approximately 30° C. with an excess of hydrogen halide and separating organic material thereby liberated, said organic material consisting of a substantially acid insoluble fluid phase comprising essentially organic halides.

4. In a process for removing organic impurities from sulfuric acid which has been contacted with olefinic hydrocarbon, the steps of intimately contacting said acid at a concentration of at least 80% on a hydrocarbon free basis and at a free sulfuric acid concentration of at least 35% with hydrogen chloride at a temperature between the freezing point of said sulfuric acid and approximately 30° C. and separating organic material thereby liberated from the acid, said organic material consisting of a substantially acid insoluble fluid phase comprising essentially organic chlorides.

5. A process for the reactivation of sulfuric acid which has lost at least a part of its effectiveness as a catalyst for the alkylation of isoparaffin with olefine through contamination with organic material in said reaction, the steps comprising saturating said acid at a concentration of at least 90% on a hydrocarbon free basis and at a free sulfuric acid concentration of at least 35% with substantially anhydrous hydrogen chloride at a temperature between the freezing point of said acid and 50° C., maintaining an intimate contact between said hydrogen chloride and said sulfuric acid for a period not exceeding approximately 20 minutes and removing organic material thereby set free from the acid, said organic material consisting of a substantially acid insoluble fluid phase comprising essentially alkyl chlorides.

6. In a process for removing organic impurities from an inorganic oxy acid which has been contacted with olefinic hydrocarbon, the step comprising intimately contacting an excess of hydrogen halide with said acid at a temperature between the freezing point of said acid and about 30° C. at which at least a part of said impurities is rendered insoluble in said acid, said insoluble impurities consisting of a fluid phase comprising essentially organic halides.

SEAVER A. BALLARD.